United States Patent [19]
O'Keefe

[11] 3,725,622
[45] Apr. 3, 1973

[54] SEMI AUTOMATIC VEHICLE SIGNAL CONTROL DEVICE

[76] Inventor: Ralph J. O'Keefe, 161 East Orangethorpe Ave., Space 12, Placentia, Calif. 92670

[22] Filed: Nov. 1, 1971

[21] Appl. No.: 194,322

[52] U.S. Cl............................................200/61.27
[51] Int. Cl................................................H01h 3/16
[58] Field of Search.....................200/61.27–61.38

[56] References Cited

UNITED STATES PATENTS 1,772,943  8/1930  Gibson...........................200/61.32
1,811,714  6/1931  Calamari........................200/61.31

Primary Examiner—Robert K. Schaefer
Assistant Examiner—M. Ginsburg
Attorney—Harold A. Dreckman

[57] ABSTRACT

When a vehicle turns to either the right or left, a signal light must be lit indicating such a turn. This invention provides a means whereby the signal light (either right or left) is turned on by the movement of the steering wheel. Movement of the steering wheel will automatically close a switch and turn on a signal light indicating to another vehicle that the one vehicle is about to execute a turn.

5 Claims, 5 Drawing Figures

PATENTED APR 3 1973 3,725,622
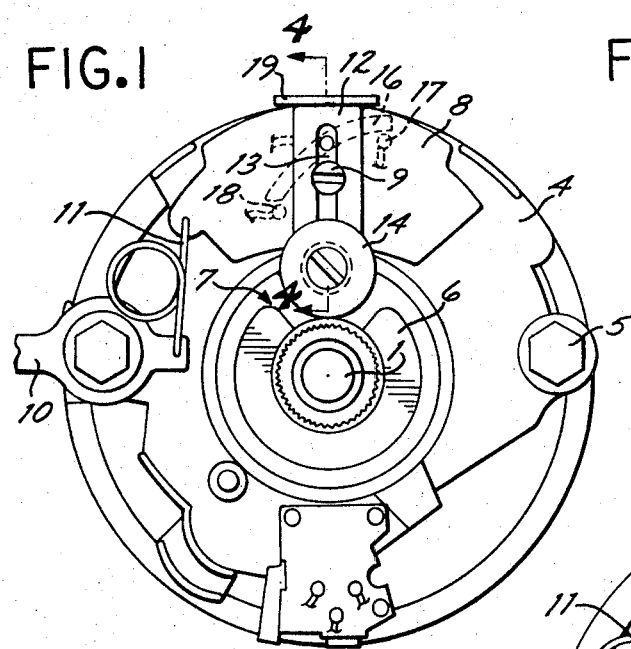
FIG.1
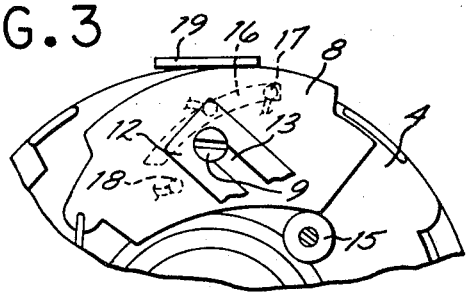
FIG.3
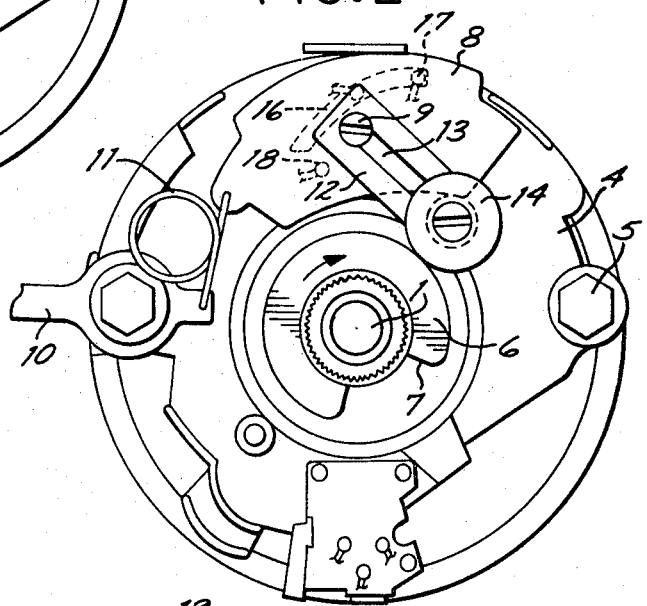
FIG.2
FIG.4
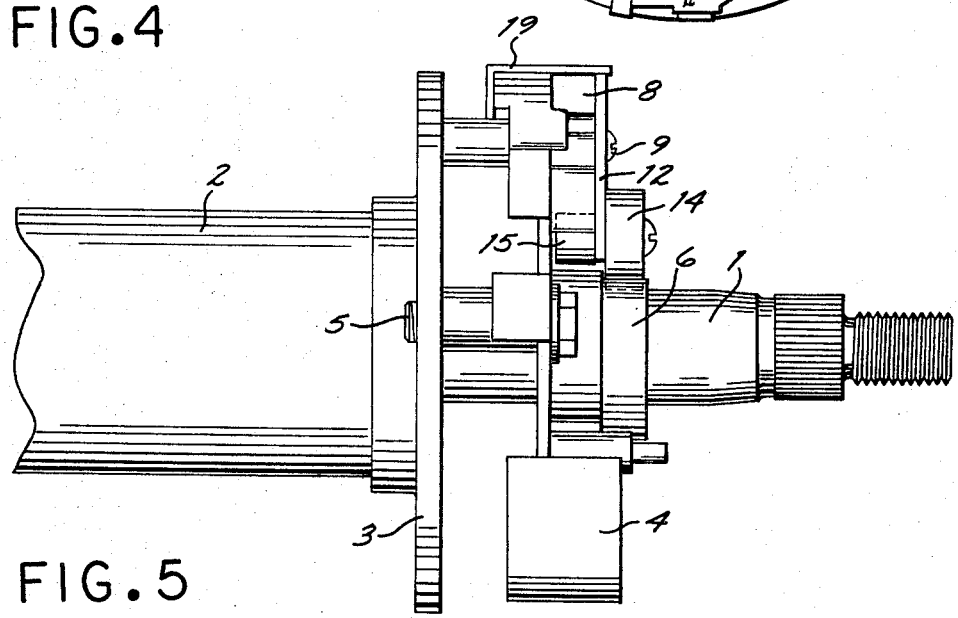
FIG.5

SEMI AUTOMATIC VEHICLE SIGNAL CONTROL DEVICE

An object of my invention is to provide a semiautomatic vehicle signal control device which can be attached to the usual steering column or shaft of a vehicle.

Another object is to provide a semi-automatic vehicle signal control device in which a switch is actuated upon rotation of the steering column. The switch device including a cam which engages and controls a switch.

Still another object of my invention is to provide a device of the character stated, which includes not only an semi-automatic signaling control device, but also a means which permits the driver to manually actuate the signal lights.

Other objects, advantages and features of the invention may appear from the accompanying drawings, the subjoined detailed description and the appended claims.

In the drawings:

FIG. 1 is a plan view of my vehicle signaling device.

FIG. 2 is a plan view of my vehicle signaling device showing the parts in another position.

FIG. 3 is a fragmentary plan view of my vehicle signaling device showing the parts in still another position.

FIG. 4 is a fragmentary sectional view taken on line 4—4 of FIG. 1.

FIG. 5 is a side elevation of my vehicle signaling device.

Referring more particularly to the drawing, the numeral 1 indicates a steering column or shaft which is usual and well known in the art. The steering wheel (not shown) is attached to the outer end of the steering column 1 and this is usual and well known in the art. A stationary sleeve 2 surrounds the shaft 1 and a flanged coupling 3 is secured to the outer end of the sleeve 2.

These signaling device consists of a housing 4 which is bolted and thus affixedly attached to the flanged member 3 by means of a plurality of bolts 5. A cam 6 is affixedly attached to the steering column 1 adjacent to the outer end thereof and includes a notch or recess 7. The cam 6 will rotate with the steering column 1 as the steering wheel is moved while guiding the vehicle.

A switch plate 8 is pivotally mounted on the rear wall of the housing 4 by means of the bolt 9 which screws into the rear wall.

The switch plate 8 can be rotated around the bolt 9 by means of the manually actuated handle 10 which is pivotally mounted on one of bolts 5 and includes a link 11 which moves with the handle 10 and causes the plate 8 to pivot around the bolt 9.

To automatically pivot the plate 8 around the bolt 9 as the steering wheel is moved to left or right by the operator, I provide a control finger 12 in which a slot 13 is formed. This slot permits the finger 12 to slide on the back wall of the housing 4 when engaged by the cam 6 as follows: A roller 14 rides on the periphery of the cam 6 and sets in the notch 7 in one position as shown in FIG. 1. A second roller 15 on the finger 12 is also mounted on the finger 12 and positioned back of the roller 14. The second roller engages the lower edge of the switch plate 8 and will pivot this plate on the bolt 9 as the cam 6 is rotated by movement of the steering wheel. It will thus be evident that the switch plate 8 will be revolved or tilted upwardly on the right-hand or left-hand side, depending on the rotation of the steering wheel.

To accomplish electrical contact with the signal lights, a switch sector 16 is embedded in the rear face of the switch plate 8. One leg or side of the electrical circuit is connected to the sector 16 which may be termed the hot lead of the electrical circuit. To close the circuit it is only necessary to rotate the plate 8 as previously described so that a contact button 17 or 18 comes in contact with the sector 16. The switch plate 8 is formed of an insulating material of plastic or like and, consequently, the electrical leads will not be short circuited.

A spring finger 19 is mounted on the rear face of the housing 4 and this finger engages the upper edges of both the plate 8 and the finger 12 to return these parts to the neutral position as shown in FIG. 1. Thus the parts will always be in proper non-signaling position when the steering wheel is in neutral or straight-forward position. It is only when the steering wheel is turned (left or right) that the contact button 17 or 18 will engage the sector 16 and a signal light is lit.

Having described my invention, I claim:

1. A vehicle signal light control for a vehicle including a steering column, a housing having a handle, means securing the housing to the vehicle adjacent the steering column, a switch plate pivotally mounted in said housing, an electric contact on said switch plate electrically connecting to a signal light, and means operatively coupling the steering column and the switch plate to automatically pivot the switch plate upon rotation of the steering column, and close the contact to the signal light, and manually operable means including a spring link connected to the switch plate and to the handle on the housing for manually pivoting said switch plate.

2. A vehicle signal light control as recited in claim 1, and means to pivot the switch plate including a cam on the steering column, and operating means extending from the cam to the switch plate.

3. A vehicle signal light control as recited in claim 1, said means to pivot the switch plate including a cam on the steering column, a control finger pivotally mounted on said housing, and a roller on the control finger engaging the cam.

4. A vehicle signal light control as recited in claim 1, said means to pivot the switch plate including a cam on the steering column, a control finger pivotally mounted in said housing, a roller on the control finger engaging the cam, and a second roller on the control finger engaging the switch plate.

5. A vehicle signal light control as recited in claim 1, said means to pivot the switch plate including a cam on the steering column, said cam including a notch, a control finger pivotally mounted in the housing, a roller on the control finger, said roller extending into the notch in one position to disengage the switch plate contact from said signal light.

* * * * *